United States Patent
Coldwate et al.

(10) Patent No.: US 8,643,244 B2
(45) Date of Patent: Feb. 4, 2014

(54) STRENGTH CAST ROTOR FOR AN INDUCTION MOTOR

(75) Inventors: Joseph Kenneth Coldwate, Roscoe, IL (US); Eric A. Brust, Machesney Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 198 days.

(21) Appl. No.: 13/189,761

(22) Filed: Jul. 25, 2011

(65) Prior Publication Data

US 2013/0026876 A1 Jan. 31, 2013

(51) Int. Cl.
*H02K 1/06* (2006.01)

(52) U.S. Cl.
USPC .................................. 310/216.004

(58) Field of Classification Search
USPC ........... 310/216.001–216.137, 211, 212, 215, 310/166, 125
See application file for complete search history.

(56) References Cited

U.S. PATENT DOCUMENTS

| | | | |
|---|---|---|---|
| 3,758,800 A * | 9/1973 | McLaughlin | 310/211 |
| 4,309,635 A | 1/1982 | Sei et al. | |
| 5,642,010 A * | 6/1997 | Carosa et al. | 310/211 |
| 6,020,661 A * | 2/2000 | Trago et al. | 310/43 |
| 6,091,168 A | 7/2000 | Halsey et al. | |
| 6,289,663 B1 | 9/2001 | Schroder | |
| 6,483,220 B1 | 11/2002 | Johnsen | |
| 7,036,301 B2 | 5/2006 | Wassenhoven | |
| 7,208,854 B1 | 4/2007 | Saban et al. | |
| 7,217,100 B2 | 5/2007 | Benderradji et al. | |
| 7,527,479 B2 | 5/2009 | Shi et al. | |
| 7,834,509 B2 | 11/2010 | Legros et al. | |

FOREIGN PATENT DOCUMENTS

JP 08-149769 * 6/1996

OTHER PUBLICATIONS

Machine translation of JP 08-149769 A, Shigeka et al, Jun. 7, 1996.*

* cited by examiner

*Primary Examiner* — Nguyen N Hanh
(74) *Attorney, Agent, or Firm* — Carlson, Gaskey & Olds, PC

(57) ABSTRACT

A rotor for an induction motor has a plurality of central laminations defining a central bore extending along an axis. End laminations are at each axial end of the central laminations. Metal is within gaps formed between lamination teeth. The end laminations have teeth extending radially outwardly from a central ring portion. A bore is formed in a face of the end laminations facing outwardly, and adjacent to where the teeth connect into the central ring portion. A motor and method are also described.

27 Claims, 2 Drawing Sheets

STRENGTH CAST ROTOR FOR AN INDUCTION MOTOR

BACKGROUND

This application relates to a rotor for an induction motor wherein counter-bored holes are formed within the laminated core to reduce the likelihood of tears (cracks) forming during casting.

Induction motors are known, and typically include a squirrel cage assembly as part of a rotor. A stator surrounds the rotor, and the rotor is typically associated with a shaft which is to be driven to perform some use.

The rotor is formed of a pack of central iron laminations which are assembled together. End laminations are assembled at each end of the pack of central laminations. The combined laminations are placed into a mold, and a molten metal, typically copper or aluminum is moved into the mold. The laminations are all formed with teeth and gaps circumferentially spaced between the teeth. The gaps between teeth form slots. The molten metal moves into the gaps between the teeth (i.e. slots), forming bars. The molten metal also flows into cylindrical volumes at each end of the rotor, formed by cavities within the mold. These form the end-rings of the rotor. The bars and end-rings are to be homogeneous as formed by the casting process.

As the metal cools, the stresses across the entire rotor vary due to localized cooling differences. The mechanical joints between the bars and the end-rings have sometimes been subject to tears due to these stresses.

SUMMARY

A rotor for an induction motor has a plurality of central laminations defining a central bore extending along an axis. End laminations are at each axial end of the central laminations. Metal is within gaps between teeth (i.e. slots) of the laminations. The lamination teeth extend radially outwardly from a central ring portion. A bore is formed in a face of the end laminations facing outwardly, and adjacent to where the teeth connect into the central ring portion.

A motor including such a rotor, and a method are also claimed.

These and other features of the present invention can be best understood from the following specification and drawings, of which the following is a brief description.

DETAILED DESCRIPTION

Figure 1:
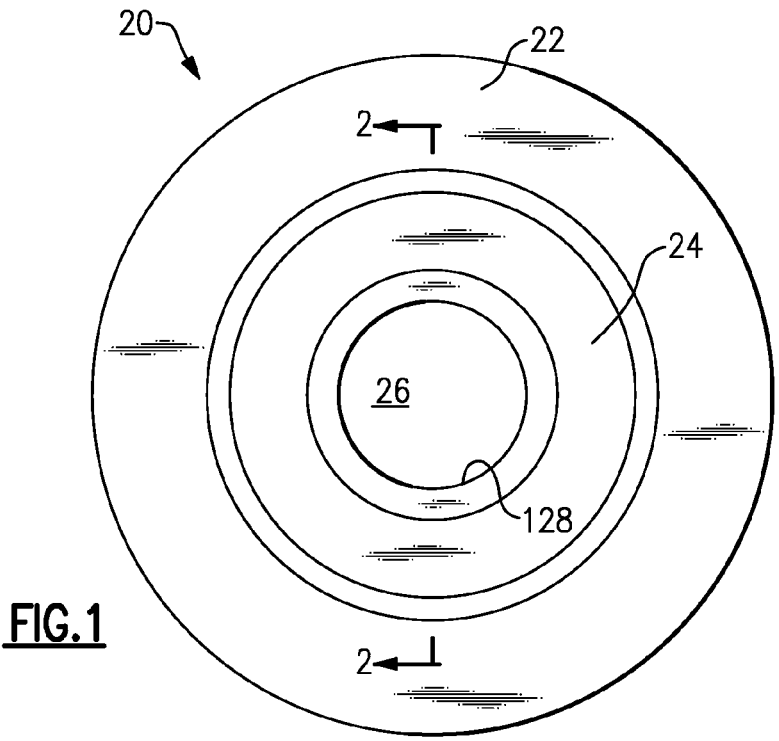
FIG. 1 schematically shows a motor.

A motor 20 is shown schematically in FIG. 1. As known, a stator 22 surrounds a rotor 24. A shaft 26 is mounted within a central bore 128 in the rotor 24. As known, the stator 22 drives the rotor 24 to rotate, and thus powers some use associated with the shaft 26. The motor, as shown in FIG. 1, may be an induction motor.

Figure 2:
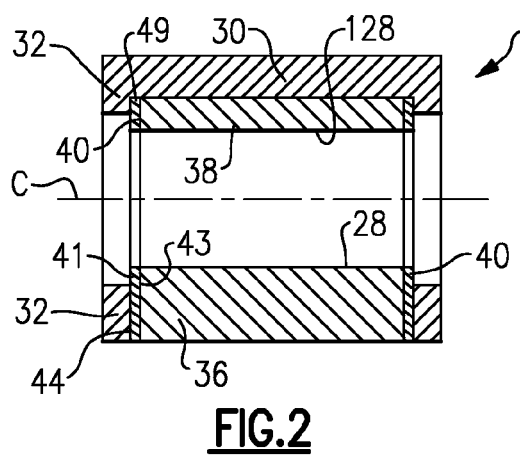
FIG. 2 is a cross-sectional view of a rotor associated with the motor.

FIG. 2 is a cross-sectional view along line 2-2, and extends through bars 30 and laminations having a central ring 38 (i.e. yoke), and also through teeth 36 in the laminations. The rotor 24 includes a central lamination portion 28 which is formed of a plurality of thin plates, or central laminations, although the individual laminations are not illustrated. Portion 28 has end laminations 40 are positioned at each end of the combined central laminations 28. The end laminations have teeth as shown at 44, and gaps 49 between the teeth 44 (see FIG. 4A). The rotor extends along an axis C, which is the center of bore 128.

While the teeth and gaps may differ slightly through the central laminations at 28, the central laminations 28 have similar structure.

Thus, as shown at the top of FIG. 2, metal 30 sits in the gaps 49. On the lower end, the teeth 36/44 extend generally to the radially outermost end of the rotor 24. As also shown, end-rings 32 of the metal extend axially outwardly of the end laminations 40. The end laminations 40 have a face 41 facing outwardly, and a face 43 facing the central portion 28, or inwardly.

Figure 3:
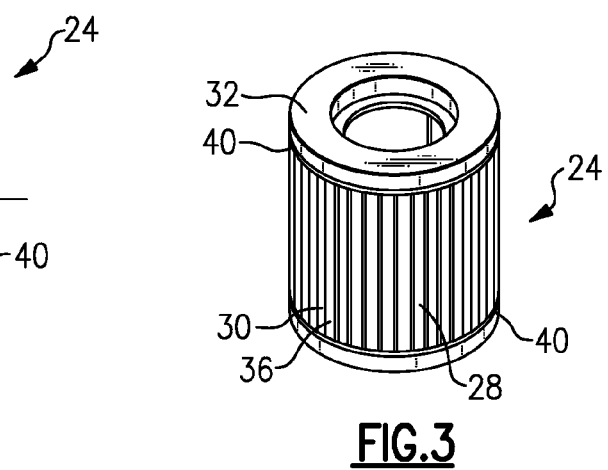
FIG. 3 is another view of the rotor.

As shown in FIG. 3, one can see the spaced teeth 36 and metal 30 which is extended into the gaps in the central laminations of the central portion 28.

Figure 4A:
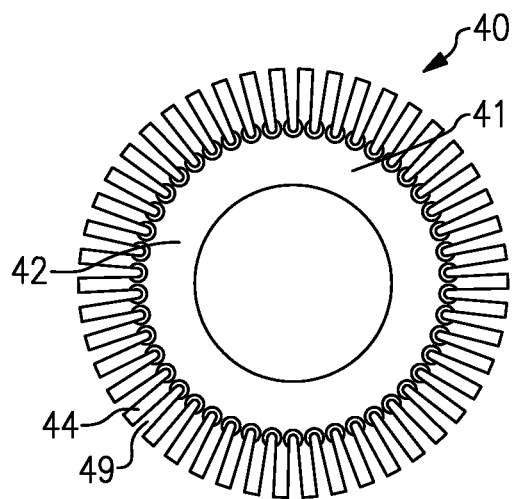
FIG. 4A shows an end lamination.

FIG. 4A shows the end laminations 40. As shown, the outer face 41 has a central ring-like portion 42, with teeth 44 extending radially outwardly and with central gaps 49.

Figure 4B:
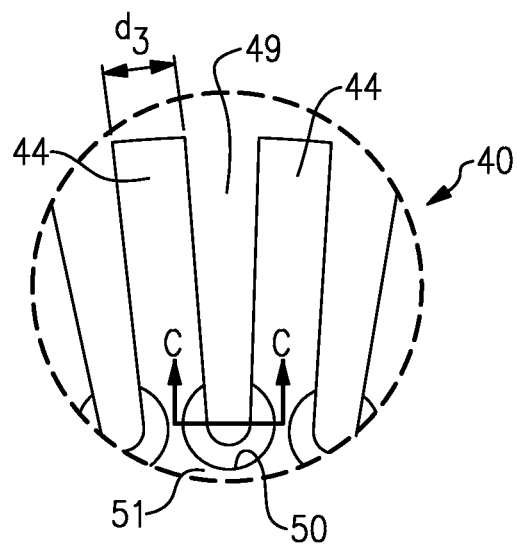
FIG. 4B shows a detail of the FIG. 4A end lamination.

FIG. 4B shows a detail of two circumferentially adjacent teeth 44 and the gap between them 49. As can be seen, a counterbore is drilled at 50 into the face 41. Counterbore 50 is part circular and extends across two teeth 44, and into a central bridging portion 41 which is at a root of the gap formed between the teeth (i.e. slot) 49. As can be appreciated, two counterbore portions are found in each of the teeth 44.

Figure 4C:
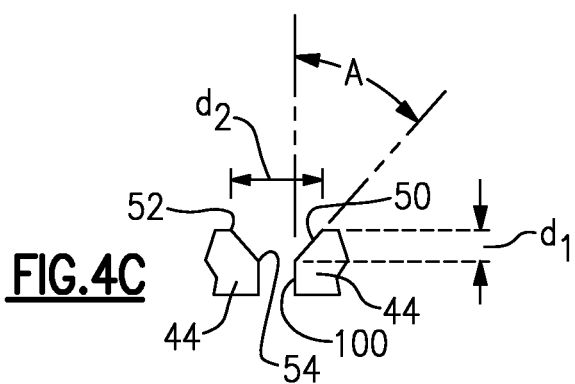
FIG. 4C is a detail along the cross-section C-C of FIG. 4B.

A face of counterbore 50 is shown in FIG. 4C to extend generally at a chamfer angle A measured from edge 100 of teeth 44. In one embodiment, the angle A was 45°. In embodiments, the angle A may be between 40° and 50°. As shown, a circumferential edge 54 of the counterbore 50 is deeper than the other end 52. Again, the angle A results in the change in depth.

As shown in FIG. 4C, the diameter $d_2$ of counterbore 50, or the distance between two opposed points at 52 is .150" (.381 cm). A depth $d_1$ of the counterbore at edge 54 was .046" (.117 cm). As shown in FIG. 4B, there is a circumferential width $d_3$ to the teeth. In one embodiment, $d_3$ was .114" (.290 cm). As is clear from FIG. 4B and 4C, the depth of the counterbore 50 is not entirely through the thickness of the teeth, but rather is merely into a portion of the thickness beginning at the face 41.

In embodiments, the ratio of $d_3$ to $d_2$ was between 0.684 and 0.841. The ratio of $d_1$ to $d_2$ was between 0.213 and 0.407.

The chamfer counterbores may be drilled to the shape and depth as shown. The chamfer improves the flow of molten metal during casting and addresses the stress tears that occurred in the prior art.

Although embodiments of this invention have been disclosed, a worker of ordinary skill in this art would recognize that certain modifications would come within the scope of this invention. For that reason, the following claims should be studied to determine the true scope and content of this invention.

What is claimed is:
1. A rotor for an induction motor comprising:
a plurality of central laminations defining a central bore extending along an axis, end laminations at each axial end of said central laminations, said central and end laminations each having teeth extending radially outwardly of circumferentially intermediate gaps, and metal within said gaps; and said end lamination teeth extending radially outwardly from a central ring, with said end laminations having a face facing outwardly and away from said central laminations, with a counterbore formed in said face of said end laminations adjacent to where said teeth connect into said central ring.

2. The rotor as set forth in claim 1, wherein said counterbore is in the shape of a part-circular form.

3. The rotor as set forth in claim 2, wherein said counterbore extends at an angle relative to a circumferential side of said teeth such that it is deeper at a circumferential edge of one of said teeth, and extends to end at a location within a circumferential width of said teeth.

4. The rotor as set forth in claim 3, wherein said counterbore angle being in a range of 40° to 50°.

5. The rotor as set forth in claim 4, wherein a depth of the counterbore at the circumferential edge of the teeth to a diameter of the counterbore is between .213 and .407, a ratio of a circumferential width of said teeth to a diameter of said counterbore is between .684 and .841, said counterbore extends into each of two adjacent teeth, and then through a portion of said central ring which forms a root of said teeth, and counterbores are formed in each adjacent pair of teeth, such that each of said teeth has a portion of two of said counterbores.

6. The rotor as set forth in claim 3, wherein a depth of the counterbore at the circumferential edge of the teeth to a diameter of the counterbore is between .213 and .407.

7. The rotor as set forth in claim 2, wherein a ratio of a circumferential width of said teeth to a diameter of said counterbore is between .684 and .841.

8. The rotor as set forth in claim 1, wherein said counterbore extends into each of two adjacent teeth, and then through a portion of said central ring which forms a root of said teeth.

9. The rotor as set forth in claim 8, wherein counterbores are formed in each adjacent pair of teeth, such that each of said teeth has a portion of two of said counterbores.

10. The rotor as set forth in claim 1, wherein said end laminations have an axial thickness, and said counterbore extending from said face into said axial thickness, but not entirely through said end laminations.

11. A rotor and shaft for use in a motor comprising:
a rotor body formed of a plurality of central laminations defining a central bore extending along an axis, end laminations at each axial end of said central laminations, said central and end laminations each having teeth extending radially outwardly of circumferentially intermediate gaps, and metal within said gaps;
said end lamination teeth extending radially outwardly from a central ring, with said end laminations having a face facing outwardly and away from said central laminations, with a counterbore formed in said face of said end laminations adjacent to where said teeth connect into said central ring; and
a shaft received in said central bore in said central and end laminations.

12. The rotor and shaft as set forth in claim 11, wherein said counterbore is in the shape of a part-circular form.

13. The rotor and shaft as set forth in claim 12, wherein said counterbore extends at an angle relative to a circumferential side of said teeth such that it is deeper at a circumferential edge of one of said teeth, and extends to end at a location within a circumferential width of said teeth.

14. The rotor and shaft as set forth in claim 13, wherein said counterbore angle being in a range of 40° to 50°.

15. The rotor and shaft as set forth in claim 13, wherein a depth of the counterbore at the circumferential edge of the teeth to a diameter of the counterbore is between .213 and .407.

16. The rotor and shaft as set forth in claim 12, wherein a ratio of a circumferential width of said teeth to a diameter of said counterbore is between .684 and .841.

17. The rotor and shaft as set forth in claim 9, wherein said bore extends into each of two adjacent teeth, and then through a portion of said central ring which forms a root of said teeth.

18. The rotor and shaft as set forth in claim 11, wherein said end laminations have an axial thickness, and said counterbore extending from said face into said axial thickness, but not entirely through said end laminations.

19. A motor comprising:
a stator;
a rotor body formed of a plurality of central laminations defining a central bore extending along an axis, end laminations at each axial end of said central laminations, said central and end laminations each having teeth extending radially outwardly of circumferentially intermediate gaps, and metal within said gaps;
said end lamination teeth extending radially outwardly from a central ring, with said end laminations having a face facing outwardly and away from said central laminations, with a counterbore formed in said face of said end laminations adjacent to where said teeth connect into said central ring; and
a shaft received in said central bore in said central and end laminations.

20. The motor as set forth in claim 19, said counterbore is in the shape of a part-circular form, said counterbore extending at an angle relative to a circumferential edge of said teeth such that it is deeper at a circumferential edge of one of said teeth, and extends to end at a location within a circumferential width of said teeth, and said angle being in a range of 40° to 50°.

21. The motor as set forth in claim 20, wherein said counterbore extends into each of two adjacent teeth, and then through a portion of said central ring which forms a root of said teeth, and a ratio of a circumferential width of said teeth to a diameter of said counterbore being between .684 and .841.

22. The motor as set forth in claim 21, wherein a depth of the counterbore at the circumferential edge of the teeth to a diameter of the counterbore is between .213 and .407.

23. The motor as set forth in claim 20, wherein a depth of the counterbore at the circumferential edge of the teeth to a diameter of the counterbore is between .213 and .407.

24. The motor as set forth in claim 19, wherein said end laminations have an axial thickness, and said counterbore extending from said face into said axial thickness, but not entirely through said end laminations.

25. A method of installing a rotor into a motor comprising the steps of:
inserting a rotor into a bore within a stator of a motor, said rotor including a plurality of central laminations defining a central bore extending along an axis, end laminations at each axial end of said central laminations, said central and end laminations each having teeth extending radially outwardly of circumferentially intermediate gaps, and metal within said gaps; and
said end laminations teeth extending radially outwardly from a central ring, with said end laminations having a face facing outwardly and away from said central laminations, with a counterbore formed in said face of said end laminations adjacent to where said teeth connect into said central ring.

26. The method as set forth in claim 25, wherein said counterbore is in the shape of a part-circular form, said counterbore extending at an angle relative to a circumferential edge of said teeth such that it is deeper at a circumferential edge of one of said teeth, and extends to end at a location within a circumferential width of said teeth, and said angle being in a range of 40° to 50°, said counterbore extends into each of two adjacent teeth, and then through a portion of said central ring which forms a root of said teeth, and a ratio of a circumferential width of said teeth to a diameter of said counterbore being between .684 and .841, and a depth of the counterbore at the circumferential edge of the teeth to a diameter of the counterbore is between .213 and .407.

27. The method as set forth in claim 25, wherein said end laminations have an axial thickness, and said counterbore extending from said face into said axial thickness, but not entirely through said end laminations.

\* \* \* \* \*

UNITED STATES PATENT AND TRADEMARK OFFICE
CERTIFICATE OF CORRECTION

PATENT NO. : 8,643,244 B2  
APPLICATION NO. : 13/189761  
DATED : February 4, 2014  
INVENTOR(S) : Coldwate et al.

Page 1 of 1

It is certified that error appears in the above-identified patent and that said Letters Patent is hereby corrected as shown below:

IN THE CLAIMS:

Claim 11, column 4, line 8: "9" should read as --11--

Signed and Sealed this  
Thirteenth Day of May, 2014

Michelle K. Lee  
*Deputy Director of the United States Patent and Trademark Office*